United States Patent [19]

Negele et al.

[11] 4,391,476
[45] Jul. 5, 1983

[54] ROLLER BEARING

[75] Inventors: Richard Negele, Esslingen; Dieter Pfeifle, Filderstadt, both of Fed. Rep. of Germany

[73] Assignee: SKF Kugellagerfabriken GmbH, Schweinfurt, Fed. Rep. of Germany

[21] Appl. No.: 174,641

[22] Filed: Aug. 1, 1980

[30] Foreign Application Priority Data

Aug. 9, 1979 [DE] Fed. Rep. of Germany ....... 2932290

[51] Int. Cl.³ .............................................. F16C 33/46
[52] U.S. Cl. ................................ 308/207 R; 308/216; 308/217; 308/187.2; 308/DIG. 11
[58] Field of Search ........... 308/217, DIG. 11, 207 R, 308/187.2, 187.1, 201, 216

[56] References Cited

U.S. PATENT DOCUMENTS

| 3,975,066 | 8/1976 | Hofmann et al. | 308/217 |
| 4,077,235 | 3/1978 | Kleinschmidt et al. | 308/207 R |
| 4,153,309 | 5/1979 | Markfelder et al. | 308/217 |
| 4,236,767 | 12/1980 | Feldle | 308/DIG. 11 |

Primary Examiner—Lenard A. Footland
Attorney, Agent, or Firm—Daniel M. Rosen

[57] ABSTRACT

A rolling bearing having rolling means guided in a cage between inner and outer bearing rings, and including a groove on one side of one bearing ring accommodating a radial projection of the cage and another groove on the other side of the bearing ring having inserted therein a separately formed restraining element for axially fixing the cage with respect to that bearing ring.

5 Claims, 5 Drawing Figures

ROLLER BEARING

BACKGROUND OF THE INVENTION

The present invention relates to a roller bearing having rollers guided in a cage, and wherein the cage is provided with a radial angular projection on a side ring. The projection engages an annular groove of one of either the inner or outer bearing rings, in order to fix the cage in an axial direction.

DESCRIPTION OF THE PRIOR ART

It is known from DE-PS No. 445,720 that a bearing cage may be provided with spring-action radial projections, which extend into an annular groove in the bearing casing, in order to axially fix the cage in a bearing which is provided with only one fixed lateral restraining flange. The lateral restraining flange provided in this known bearing is formed integrally with the bearing casing and does indeed ensure axial guidance of the rollers towards one side. However, it requires more materials and hence more machining, and it also makes machining difficult, particularly in the raceway because the latter may not be ground throughout, or because the recesses, which are made extremely small due to the requirement related to the load-bearing capacity, make the required precise working of the raceway more difficult.

It has also become known to avoid this drawback by completely dispensing with a restraining flange, and to guide the cage in both axial directions exclusively by means of radial projections (U.S. Pat. Nos. 2,969,266 and 4,153,309). In particular, applications in which a certain axial thrust upon the rollers, hence upon the cage, is unavoidable, there is the danger that the projection of the cage, which cage is generally made of plastic material, will run for long periods of time against the side walls of the groove of the bearing ring, which is made of roller-bearing steel, and will be worn. In extreme cases, the projection, which generally has small dimensions, may become so drastically worn and eroded that reliable axial guidance of the cage is no longer ensured.

SUMMARY OF THE INVENTION

It is therefore the prime object of the present invention to provide a roller bearing with a relatively simple structure, manufactured and assembled in a relatively simple fashion, but which nevertheless ensures faultless axial guidance of the cage, in either one or both axial directions.

In accordance with the foregoing object, the present invention provides a roller bearing with a restraining flange which extends into an annular groove, to ensure axial positioning of the cage in the axial direction in satisfactory manner. It is possible to mount the bearing in a manner such that the axial thrust normally occurs in the direction towards the inserted restraining flange. By making the restraining flange separate, material consumption as well as consumption of materials to be machined, and hence scrap, is diminished. Further machining of the raceway is facilitated because there are no protruding parts lying within the range of the annular groove provided for the restraining flange.

By making the surfaces over which the cage projection must be pushed conical, insertion of the cage is facilitated. When the cage is pushed on to these conical sections, the section of the cage that carries the projection is elastically compressed (or stretched), so that it can be easily snapped with spring-action into the annular groove. Depending on the side from which the cage is to be inserted, these conical sections are arranged on different sides of the respective bearing rings.

In accordance with a further characteristic of the invention, the groove edge of the annular groove in which the projection of the cage engages has a diameter which, compared to the respective raceway, is smaller if the annular groove is provided in the bearing outer ring, and larger if the annular groove is provided in the inner ring of the bearing. As a result, the running surface for the cage may be increased without complicating the insertion of the cage. The shoulder thus formed, although protruding over the raceway, interferes relatively little during processing. This result is achieved because, in practice, an increased recess is produced by the adjacent annular groove for accommodating the projection of the cage, permitting a run-out or rest for the grinding disc, or makes it possible to use a wider grinding disc. The slightly protruding shoulder requires an expenditure of material and machining that is only slightly greater. It is possible, however, to shape this protruding section of the shoulder without machining, from the material lying between the side wall of the annular groove and the frontal surface of the bearing ring.

It is further possible to make the production and assembly of a bearing according to the invention considerably easier, by adopting an embodiment in which the two annular grooves in the bearing ring are shaped mirror-image fashion with respect to the central plane of the bearing, and having identical cross-sectional shapes. In this case, manufacturing tools for recessing the annular grooves and for shaping the ring sections that lie next to these annular grooves may be made considerably simpler and be easily interchangeable. Furthermore, manufacture itself is simpler, and most importantly, the assembly of the bearing does not require that major attention and care be paid to the possibility of mixing up the sides of the bearing ring.

The invention may be used with all roller-bearing types, and also with bearings in combination with roller-bearings, for example, a bearing with one ball row and one roller row. Instead of a restraining flange, it is also possible to insert a seal in the annular groove, which seal, in addition to its function of sealing, also assumes the role of a running disc.

BRIEF DESCRIPTION OF THE DRAWINGS

In the attached drawings, several examples of embodiments of the invention are illustrated.

DETAILED DESCRIPTION OF THE PREFERRED EMBODIMENT

Figure 1:
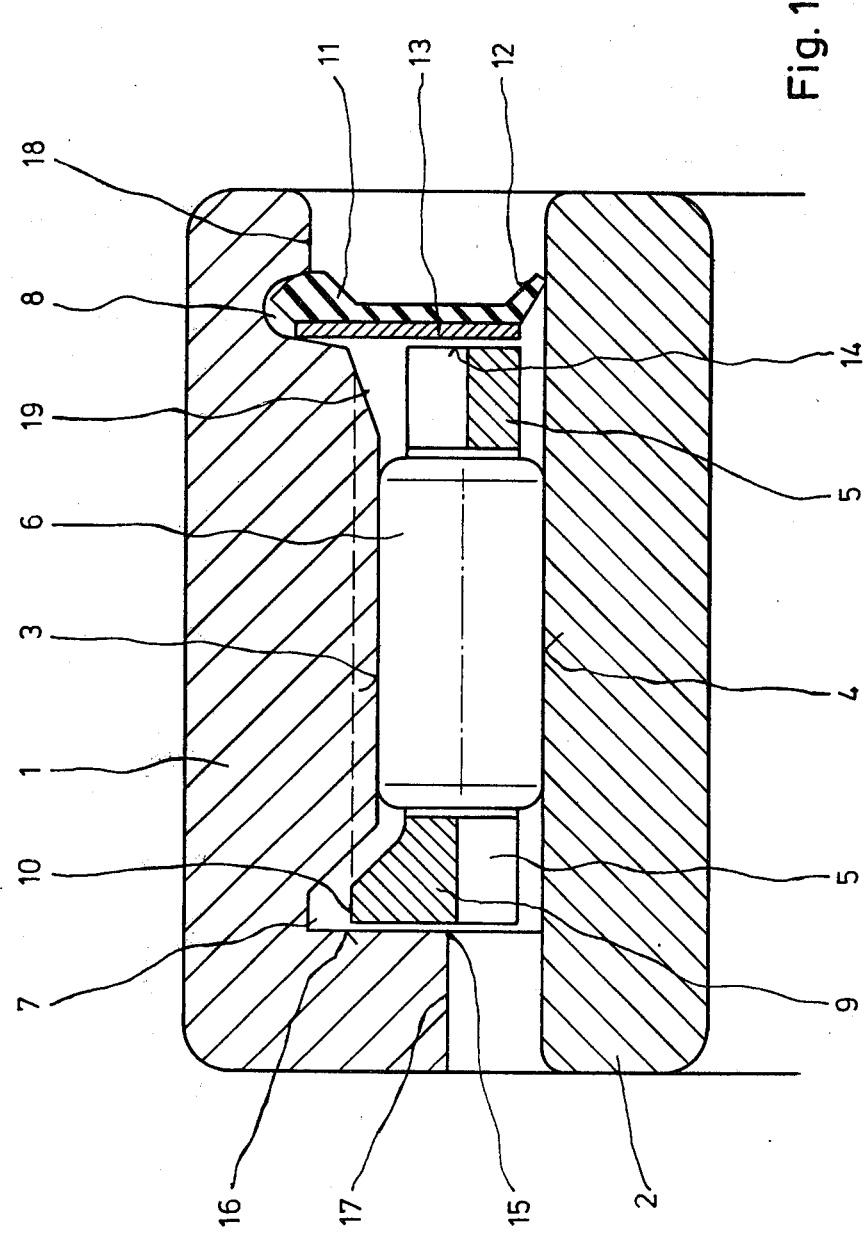
FIG. 1 shows a longitudinal section through a cylindrical roller bearing.

The bearing according to FIG. 1 consists of an outer ring 1 and an inner ring 2, both bearing rings having essentially cylindrical raceways 3 and 4, as well as rollers 6, arranged between raceways 3 and 4, and guided in a cage 5. The outer ring 1 is provided at both ends of its bore with annular grooves 7 and 8. An annular projection 10 is arranged on the cylindrical surface of one of the side rings 9 of cage 5 and projects radially outward, entering the annular groove 7 and positioning the cage 5 towards one side (the left side in FIG. 1). In the annular groove 8 provided on the side of outer ring 1 opposite to annular groove 7, there in inserted a seal 11, with its free sealing lip 12 slidably abutting on to the extension of raceway 4. This seal 11, which is provided with a metal reinforcing disc 13, also serves as a running/restraining flange for the front side of the other side ring 14 of cage 5, and axially fixes the cage towards this (right) side. In order to increase the axial running surface of cage 5 toward one (left) side, in the example of embodiment here represented, the groove-edge 15 has a diameter that is smaller than the diameter of raceway 3. The groove edge 15 refers to the inner edge of the outer side wall 16 of the annular groove 7. Although the protruding shoulder 17 of outer ring 1 prevents a through-grinding of raceway 3, the invention of FIG. 1 still provides the advantage that the annular groove 7 may in practice be considered an increased diameter recess adjacent raceway 3, into which recess the grinding disc may enter or come to rest, when the raceway 3 is machined.

In order to be able to insert the cage 5 in the outer ring 1, shoulder 18 of annular groove 8 has a diameter that is identical to or slightly greater than the largest diameter of projection 10 of cage 5. Also, between raceway 3 and annular groove 8 there is provided a conical section 19, which widens in a direction towards annular groove 8. Prior to inserting seal 11, cage 5 may be inserted into the bearing from the side of the annular groove 8. As a result, the annular projection 10 is elastically compressed by conical section 19, and then pushed in this compressed state over raceway 3 up to groove 7. Upon reaching groove 7, cage 5 again expands in an outward direction and thus snaps into the opening provided by the annular groove 7. Next, rollers 6 are snapped into cage 5, and seal 11 is then inserted into annular groove 8. With the subsequent insertion of inner ring 2, assembly of the bearing is completed. It should be mentioned at this point that it is, of course, also possible to dispense with inner ring 2, and to provide the inner raceway for rollers 6 directly upon the shaft or equivalent.

Figure 2:
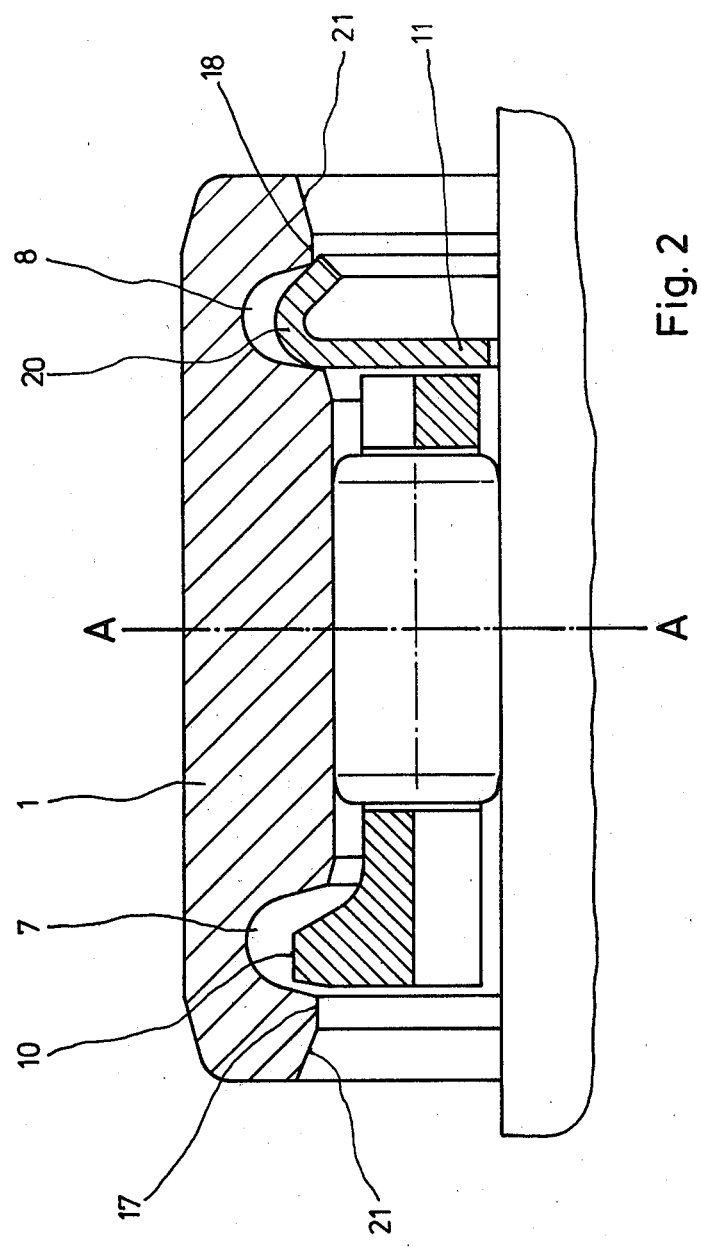
FIG. 2 illustrates a longitudinal section through a modified cylindrical roller bearing, with an annular groove in the outer ring that is made in mirror-image fashion with respect to the central plane of the bearing.

In a further embodiment, illustrated in FIG. 2, the outer ring 1 is made mirror-image fashion with respect to the central plane A-A. Here the annular grooves 7 and 8, in mirror-image fashion have identical cross-sections. Both projection 10 of cage 5 and the fastening section 20 of seal 11 match the cross-sections of annular grooves 7 and 8. This embodiment has the advantage that the seal may be inserted into either annular groove and the projection of the cage may similarly engage either annular groove. Consequently, no special measures to prevent erroneous or mistaken assembly are required when the bearing is assembled.

In this embodiment, the cage may be inserted from the side on which the annular groove, designed to accommodate the projection, is located. In order to facilitate insertion, either shoulder 17 alone or shoulder 18 as well, may be made so as to widen in slightly conical fashion towards the outside, as designated in FIG. 2 by 21. This particular embodiment has the advantage that the outer ring raceway can be ground in through-fashion, without interference by restraining flanges. Restraining flanges made integrally with the outer ring are avoided, thus producing savings in material, savings in processing, and savings in scrap.

Figure 3:
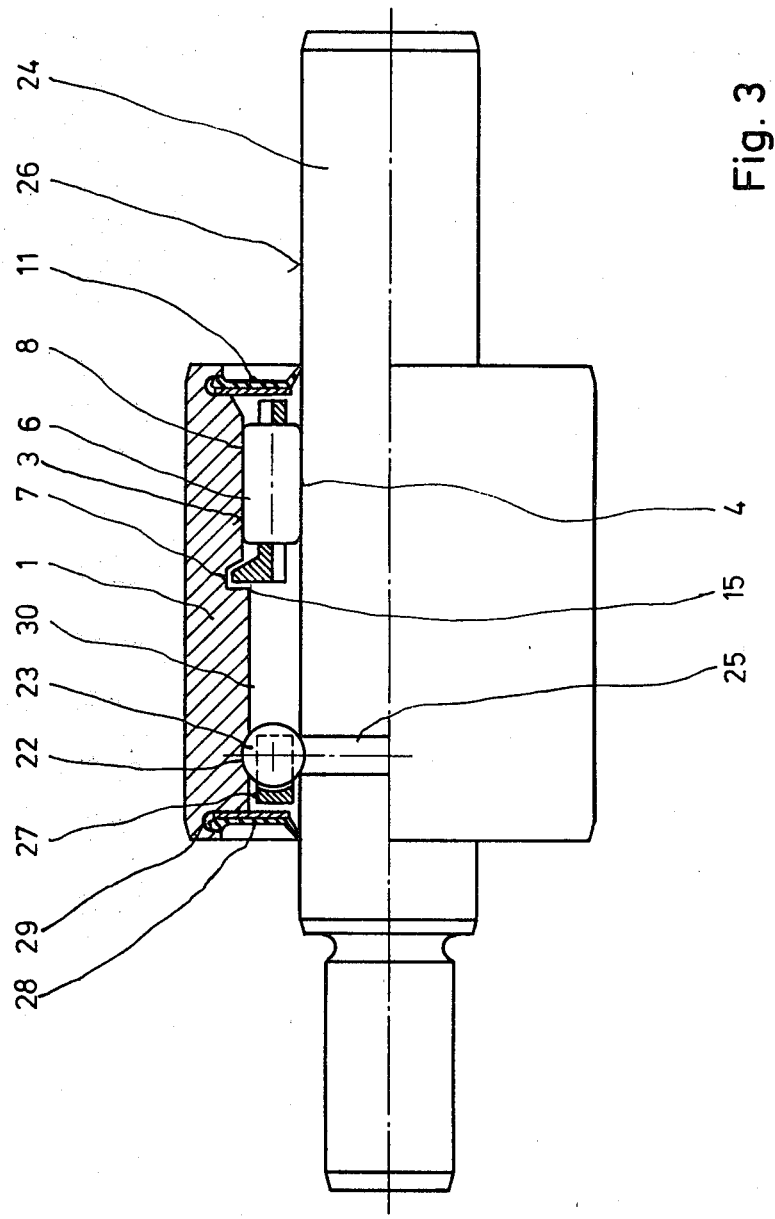
FIG. 3 is a longitudinal section through a bearing with one row of balls and one row of rollers.

In FIG. 3 a further embodiment is shown wherein a bearing features, in addition to a row of rollers, a row of balls. Outer ring 1 is provided here with both a cylindrical raceway 3 for rollers 6 and with a groove-shaped raceway 22, for balls 23. Here, the inner raceways are not on a bearing ring, but are arranged on the cylindrical surface of a shaft 24. Thus, the inner raceway for balls 23 is formed by a groove 25, and inner raceway 4 for rollers 6 is formed by a cylindrical section of cylindrical surface 26 on shaft 24. The section of the bearing that carries the row of rollers is shaped as described in the example of embodiment according to FIG. 1. Here, insertion of cage 5, with the rollers 6 already in place, is only effected when balls 23 have already been inserted and the cage 27 for the balls 23 has already been snapped into place. Finally, seal 11 is inserted in front of the row of rollers, and seal 28 is inserted in front of the balls, in the appropriate annular groove in outer ring 1. In this design in particular, the embodiment according to the invention has the advantage of permitting simple manufacture.

Thus, the recesses for annular grooves 7 and 8, for the outer raceway 22, as well as the annular groove 29 which accommodates seal 28, may be produced simultaneously with a single cutting tool. By the same token, raceways 3 and 22 for the roller or the balls, may also be ground simultaneously while recess grinding. If the grinding is limited to the raceway sections proper, that is, the section 30 of the outer ring that lies between the row of balls and the row of rollers is not further machined, this automatically produces a design in which groove edge 15 features a diameter that is smaller than raceway 3. This produces a larger (axially) running surface for cage 5 of the row of rollers.

Figure 4:
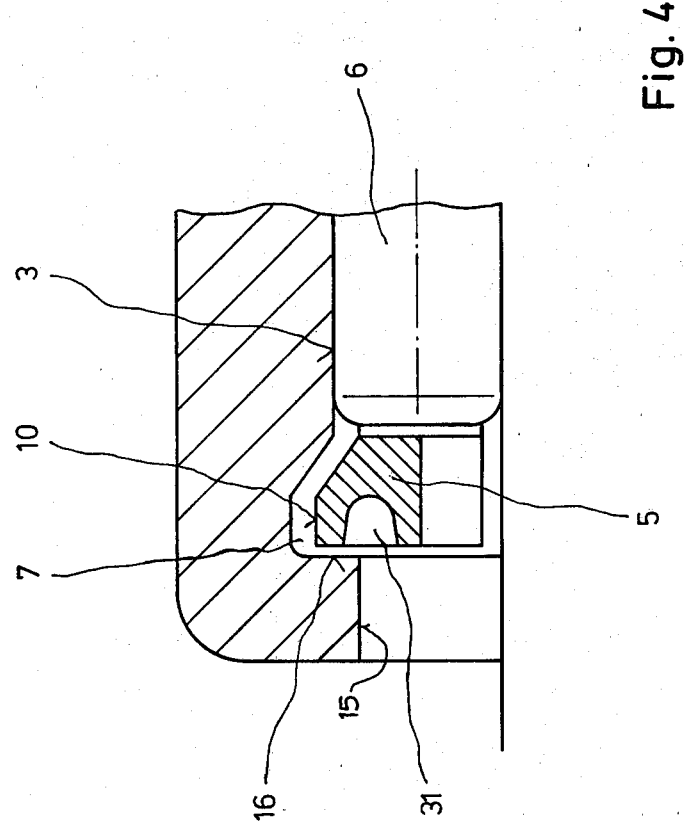
FIG. 4 is a partial longitudinal section through a cylindrical roller bearing, similar to FIG. 1, with a modified cage.

FIG. 4 represents a partial cross-section of a bearing similar to that of FIG. 1, however, the cage 5 features a recess 31 on the front side, in an axial direction, located in the area of the side ring 9 that carries projection 10, whereby the elastic yielding of projection 10 is raised, when cage 5 is snapped in place. This permits the projection to be made larger in a radial direction while allowing internal stresses to be reduced when the cage is pressed in place.

Figure 5:
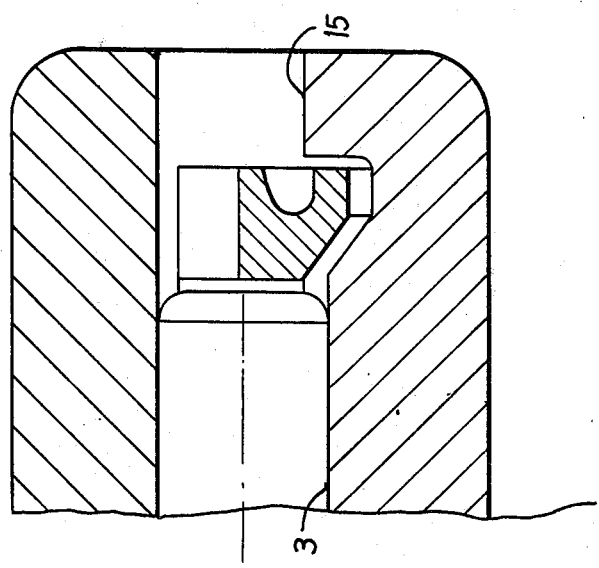
FIG. 5 is a further embodiment of a longitudinal section through a cylindrical roller bearing.

While in the presently described mode of embodiment, the projection of the cage is provided on the outer cylindrical surface of the cage, and the respective annular grooves are provided on the outer ring of the bearing it is, of course, possible to adopt, without any difficulty, an embodiment such that the projection of the cage is arranged on the bore surface of the cage, and the appropriate annular groove is arranged on the inner ring of the bearing as shown in FIG. 5, or directly on the shaft or equivalent. Nor is this invention restricted to the types of bearing described. It may be used without any difficulty with other types of roller bearings as well.

We claim:

1. In a rolling bearing with rolling means guided in a cage between inner and outer bearing rings, wherein the cage has a radially extending annular projection on a lateral ring, the projection extending into a first annular groove of one of the bearing rings for restraining the cage in one axial direction, the improvement comprising a second annular groove on the side of said one bearing ring opposite to said first annular groove, said first groove receiving said radial projection of said cage, and a separately formed restraining element inserted in said groove, said restraining ring being positioned to axially restrain said cage with respect to said one of said bearing rings in the axial direction opposite said one axial direction, said one bearing ring having a partial conical shape over which said projection may be pushed to enable insertion of said cage therein to facilitate assembly of said cage in said one bearing ring.

2. The rolling bearing of claim 1, wherein the side of said bearing ring opposite the side thereof having said first annular groove includes a section which widens or narrows conically as a section of the bearing raceway towards the respective axial end of said bearing.

3. The bearing of claims 1 or 2, wherein said first annular groove has a groove edge with a diameter which, if said first annular groove is arranged in the outer ring, is smaller, and if said first annular groove is arranged in the inner ring, is larger, than the respective raceway width.

4. In a bearing having both roller element set and ball element set rolling means, said roller element set and ball element set rolling means being guided by separate first and second cages respectively between inner and outer bearing rings, wherein the first cage is provided with a radially protruding annular projection on a lateral ring thereof, which projection extends into a first annular groove on one of the bearing rings for fixing the first cage in one axial direction, the improvement comprising a second annular groove on the side of said one bearing ring opposite to the side thereof having said first annular groove, said first groove receiving said radial projection of said cage, a separately formed restraining ring inserted in said second groove and positioned to restrain said first cage with respect to said one of said bearing rings in the axial direction opposite said one direction, and a third groove in said one bearing ring receiving said ball element set.

5. In a rolling bearing having a row of rolling elements guided in a cage to roll between inner and outer bearing rings, a first annular groove in one of said bearing rings, and an annular radially extending projection on one axial end of said cage and extending into said first annular groove for limiting the axial movement of said cage with respect to said one bearing ring in one axial direction; the improvement comprising a second annular groove in said one bearing ring adjacent the other axial end of said cage, and a separately formed restraining element mounted in said second groove and positioned to limit the movement of said cage with respect to said one bearing ring in the axial direction opposite said one axial direction, said one bearing ring being an outer bearing ring, the inner diameter of said one bearing ring between said second annular groove and the adjacent axial end thereof being greater than the outer diameter of said annular projection, the bore of said one bearing ring between said first and second annular grooves defining a race for said rolling elements, said outer bearing ring further having a conically tapered portion extending radially inwardly from said second annular groove toward the bearing race portion thereof, the larger diameter end of said conical portion having a diameter greater than outer diameter of said annular projection.

* * * * *